United States Patent

[11] 3,543,838

| [72] | Inventor | Jack Hans White<br>Huntington Beach, California |
|---|---|---|
| [21] | Appl. No. | 721,696 |
| [22] | Filed | April 16, 1968<br>Continuation-in-part of Ser. No. 618,580,<br>Feb. 27, 1967, abandoned. |
| [45] | Patented | Dec. 1, 1970 |
| [73] | Assignee | Transicold Corporation<br>Montebello, California<br>a corporation of Delaware |

[54] COOLING SYSTEM FOR VEHICLE COMPARTMENT
4 Claims, 10 Drawing Figs.

[52] U.S. Cl................................................. 165/23,
165/42, 165/160, 165/44; 62/183, 62/160, 62/323
[51] Int. Cl......................................................... B60h 3/04
[50] Field of Search........................................... 165/23, 42,
43, 44, 160; 62/183, 184, 323

[56] References Cited
UNITED STATES PATENTS

| 2,318,893 | 5/1943 | Smith | 62/183 |
|---|---|---|---|
| 2,455,421 | 12/1948 | Kirkpatrick | 62/183 |
| 2,789,794 | 4/1957 | Moore | 165/43 |
| 2,806,358 | 9/1957 | Jacobs | 165/43 |
| 2,892,319 | 6/1959 | Jacobs | 62/323 |
| 2,958,208 | 11/1960 | Bradly | 62/183 |
| 3,004,402 | 10/1961 | Sart | 62/183 |
| 3,141,498 | 7/1964 | Roane | 165/43 |
| 3,209,551 | 10/1965 | Jeutet | 62/160 |
| 3,304,735 | 2/1967 | Alexander | 62/160 |

*Primary Examiner*—William J. Wye
*Attorney*—Flehr, Hohbach, Test, Albritton & Herbert

ABSTRACT: An air-conditioning system for a truck's cab or sleeping space. The condenser for the system is cooled by the truck's engine fan. Two sets of louvers serve to independently control the airstream to the radiator. One of the two sets further serves to control the airstream passing over the condenser coils. The louvers for controlling the airstream to the condenser are subject to being opened whenever those for the radiator are opened. One embodiment provides the composite functions of heating, cooling and windshield defrosting.

Patented Dec. 1, 1970

INVENTOR.
JACK H. WHITE
BY Flehr, Hohbach, Test,
Albritton, & Herbert
ATTORNEYS

FIG. 9                    FIG. 10

INVENTOR.
JACK H. WHITE
BY Flehr, Hohbach, Test,
Albritton, & Herbert
ATTORNEYS

COOLING SYSTEM FOR VEHICLE COMPARTMENT

CROSS REFERENCE TO RELATED APPLICATION

This application is a continuation-in-part of U.S. Pat. application, Ser. No. 618,580, and now abandoned for COOLING SYSTEM FOR VEHICLE COMPARTMENT, filed Feb. 27, 1967.

BACKGROUND OF THE INVENTION

This invention relates to vehicle space cooling and heating systems and more particularly to such systems wherein, for example, cooling or heating of a cab or sleeping space of a truck is to be accomplished.

Customarily, air-conditioning systems of a type for cooling the cab or sleeping space in a truck have been characterized by the provision of relatively large and bulky apparatus carried on the roof of the cab. This apparatus normally comprises a full refrigeration system including, for example, the fans or blowers for cooling the coils of a condenser unit and other apparatus also carried on the roof.

Such apparatus provides considerable bulk and a generally unattractive appearance.

OBJECTS

According to the present invention, there has been provided such a system arranged in a novel manner with respect to a truck or the like whereby the number of roof-top elements and components is minimized to a point permitting installation of the remaining units within the cab itself. In one embodiment, in addition, space heating is also provided, as well as windshield defrosting, while adding no additional components of any significant size or bulk within the cab or otherwise.

In addition to the benefit to be gained from improving the appearance of the vehicle, the cooling system, according to the present invention, provides significant economies in the system.

It is, therefore, a general object of the invention to provide an improved space cooling system for cooling a vehicle compartment.

It is another object of the invention to provide a cooling system wherein certain elements of the system are shared in common with usual units characteristic of vehicles such as trucks.

It is a further object to provide a single system of the above type for cab cooling, heating, and windshield defrosting.

These and other objects of the invention will become more readily apparent from the following detailed description of preferred embodiments according to the invention.

SUMMARY OF THE INVENTION

In general, there is provided a cooling system for vehicles of a type having an engine, a radiator for cooling the engine, a fan associated with the radiator wherein the fan serves to move air for cooling the radiator, and an air flow control means, such as louvers, operatively coupled to respond to variations in the temperature in the radiator to vary the flow of air to the radiator.

The cooling apparatus briefly comprises, in a closed loop, cooling system components including a compressor; a condenser; and an evaporator unit disposed in a compartment of the vehicle to be cooled. The condenser unit is proximately disposed with respect to the engine fan so as to encounter the moving air; and another flow control arrangement, such as another set of louvers, serves to pass air to both the condenser and radiator. The last-named louvers are operatively coupled to respond to changes in pressure in the condenser so as to vary the flow of air to the condenser and are also subject to changes in radiator temperature, as by being conditioned by the first mentioned set of flow control louvers so as to open the second set whenever the first set has been opened.

The foregoing may be summarized as follows:

A first set of louvers, conditionable between closed and open conditions, serves to control the flow of a portion of a stream of air to the radiator. The condenser unit of a closed loop cooling system for cooling the cab of the vehicle is disposed in the same stream of air together with a second set of louvers. The second set of louvers is driven by the first set of louvers to an open condition when the first set of louvers is opened. Thus, air is passed to both the condenser and radiator units via both sets of louvers. The second set of louvers, associated with the condenser, is otherwise independently operable between open and closed conditions in response to changes in the pressure of the condenser so as to vary the flow of air to the condenser and thereby normally maintain a proper condenser operation.

In addition to the foregoing, means selectively operable serving to form a flow path from compressor to evaporator serve to direct refrigerant to the evaporator coils in a heated state whereby heating and windshield defrosting may also be accomplished.

BRIEF DESCRIPTION OF THE DRAWING

With the foregoing general summary of the apparatus, reference is made to the accompanying drawings of a preferred embodiment in which:

FIGS. 9 and 10 are respectively enlarged detail side and front elevation views showing deflectors for deflecting the stream of air discharging from plenum chamber 47' for defrosting the windshield of the vehicle.

DESCRIPTION OF THE PREFERRED EMBODIMENTS

Figure 2:
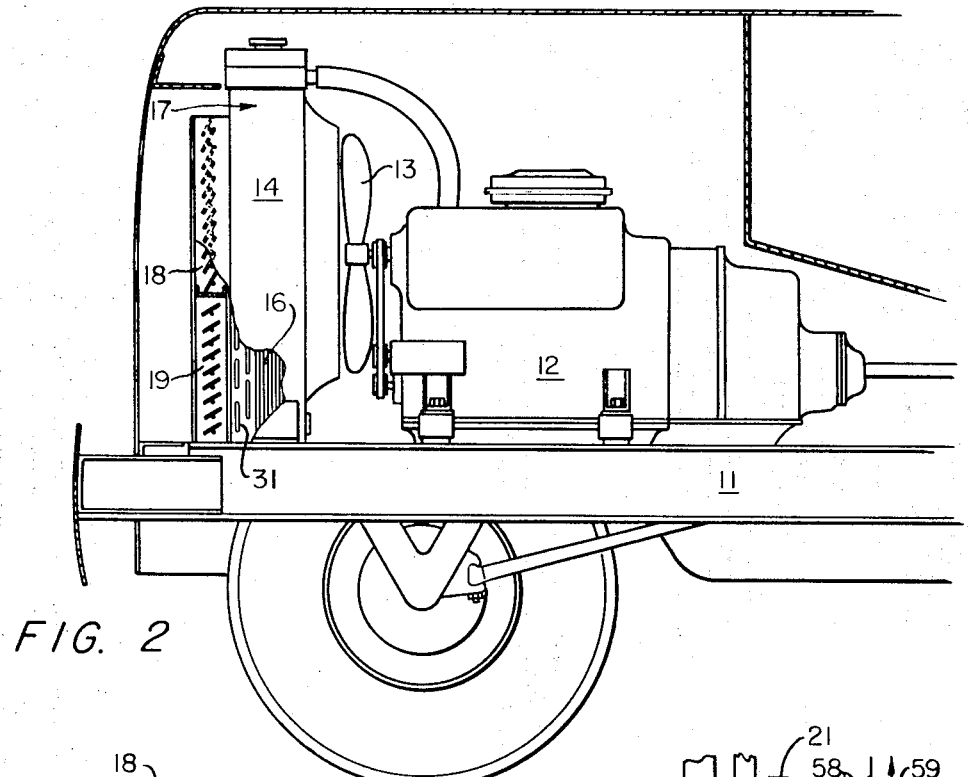
FIG. 2 is an elevation view, partly in section, showing the interior of the engine compartment of a truck.

Referring to the drawings, as in FIG. 2, a portion of a truck is shown comprising a chassis 11 supporting an engine 12 arranged in conventional style to drive a cooling fan 13. The truck includes a radiator 14, a portion of which is broken away to reveal radiator cooling coils 16 which encounter the air stream entering the front of the vehicle. Radiator cooling coils 16 extend to the upper end 17 of the radiator as well, whereby fan 13 draws the stream of air therethrough.

Air flow control means, in the form of two sets of louvers 18, 19 working together, serve to control the flow of air into radiator 14. Where engine 12 is an internal combustion engine, for example, it is desirable to control the air flow through the radiator, and consequent cooling action of radiator 14, so that the engine will run more efficiently. As is known, engines perform better at proper engine temperatures. The louvers 18 are arranged to be adjustably controlled in response to thermostat settings which serve to sense the temperature of engine coolant in radiator 14. Accordingly, when greater cooling is desired, the set of louvers 18 will be caused to provide a greater opening and when heating is desired, they are caused to provide a lesser opening. In this manner, the temperature can be maintained relatively constant.

Figure 3:
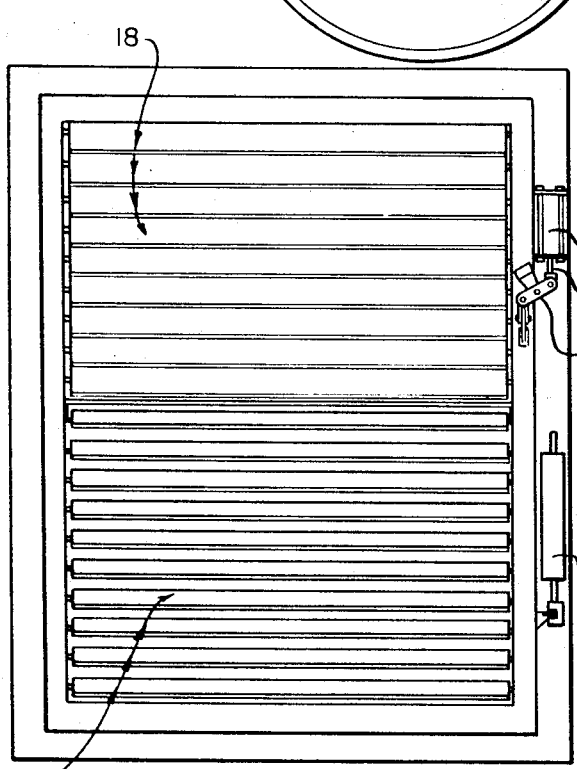
FIG. 3 is a front elevation view of airstream control means in the form of louvers for blocking or passing air to the radiator of the engine compartment as shown in FIG. 2.

Means for controlling louvers 18 includes a conventional thermostat, not shown, disposed to sense the temperature of liquid within radiator 14. A pressure-operated motor in the form of cylinder 21 (FIG. 3) having a plunger therein for driving a connecting rod 22 serves, through operation of a linkage 23, to open louvers 18 in response to increase in temperature in radiator 14.

Figure 1:
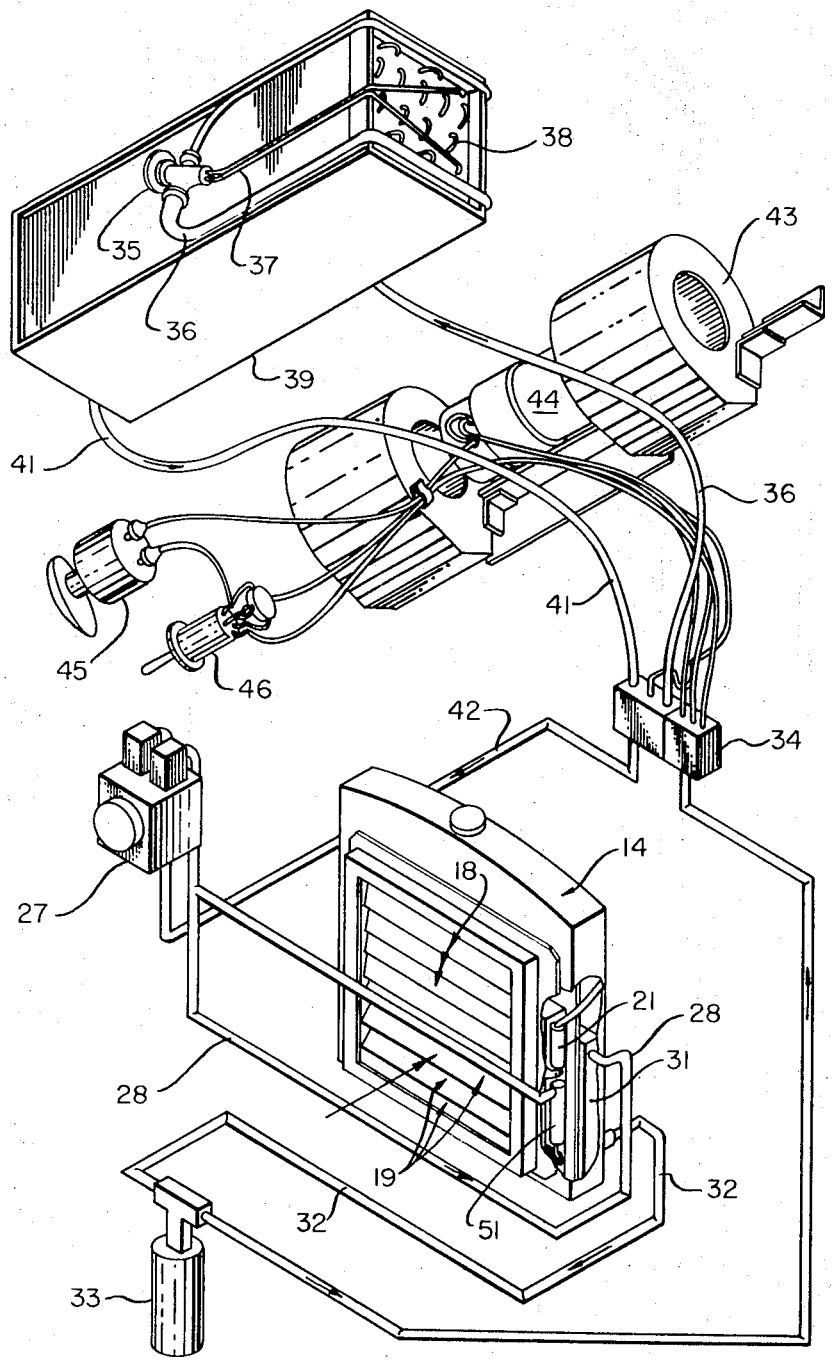
FIG. 1 shows a schematic perspective diagram of a system according to the invention.

The cooling system for cooling the cab compartment 26 of the vehicle includes, in a closed loop, a compressor unit 27 which discharges high-pressure gas via line 28 to the condenser unit 31 (FIG. 1). Condenser unit 31 condenses the high-pressure gas to high-pressure liquid which discharges via line 32, receiver-dryer unit 33, and the line connecter 34, to the expansion valve 35 via line 36. From valve 35, the coolant proceeds as a low-pressure liquid along lines 37 to the coils 38 of evaporator unit 39. Evaporator 39 discharges the refrigerant as a low-pressure gas or vapor via lines 41, 42 back to compressor 27.

An evaporator blower 43 is driven by a blower motor 44, and by means of the usual appropriate conventional controls, such as represented by the thermostat 45 and fan switch 46, the temperature within cab compartment 26 can be maintained at an appropriate level. Blower 43 discharges cooled air into plenum chamber 47 for exhausting via ports 48 into cab 26, and via channel 49 to a sleeping compartment (not shown) behind cab 26.

Louvers 19 are similarly arranged relative to condenser unit 31 whereby in response to changes of pressure therein caused by increases in temperature of the refrigerant within condenser unit 31, as sensed by conventional pressure responsive sensing devices, louvers 19 will be variously opened or closed to admit more or less air for cooling the coils of condenser unit 31.

From the foregoing, it will be readily apparent that louvers 18 respond to changes in temperature in the coils of radiator 14 and louvers 19 respond to changes of pressure in condenser unit 31. In addition, louvers 19 are operably coupled to be opened by the opening action of louvers 18 so that a maximum amount of air can be passed to cool radiator 14 when demanded.

Figure 4:
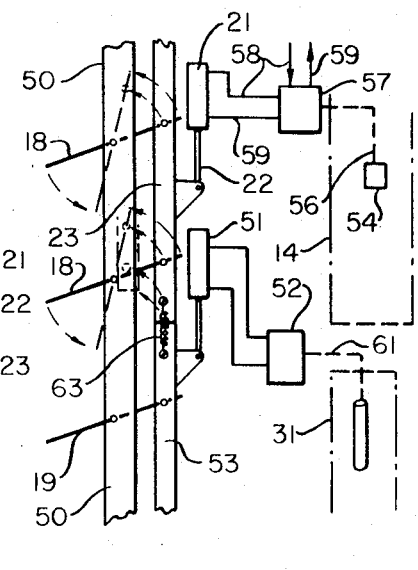
FIG. 4 is a detail view showing operable connections interrelating the actuators for two sets of louvers.
Figure 5:
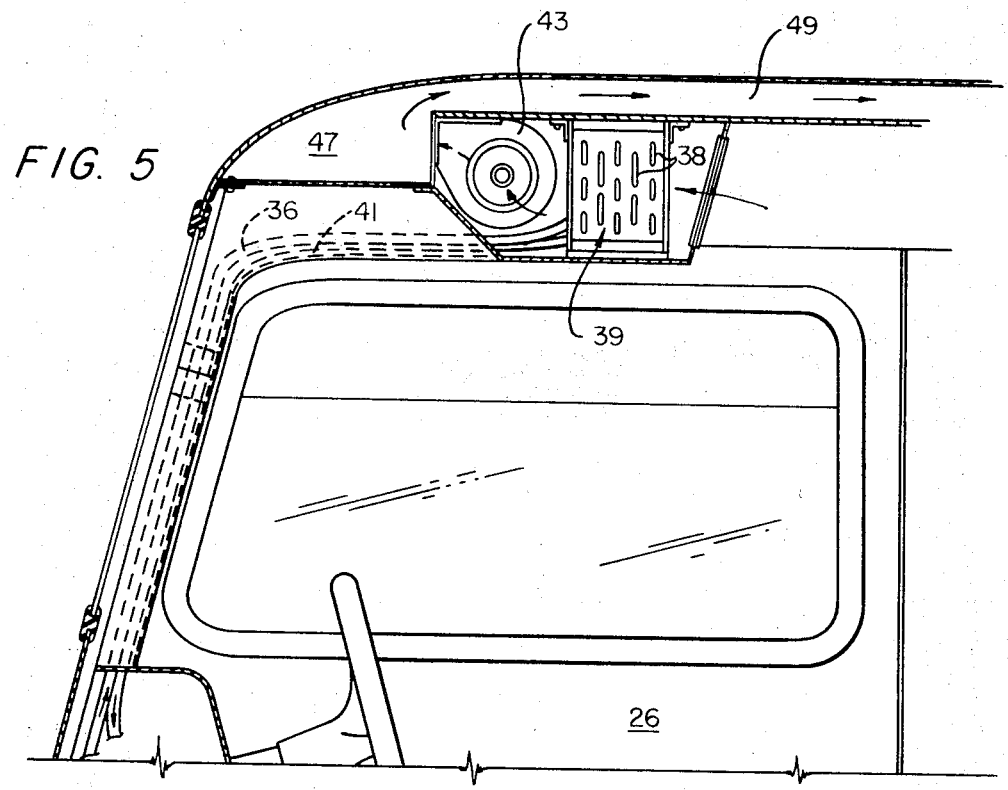
FIG. 5 is an elevation section view of a portion of the cab of a truck showing elements of the cooling system.
Figure 6:
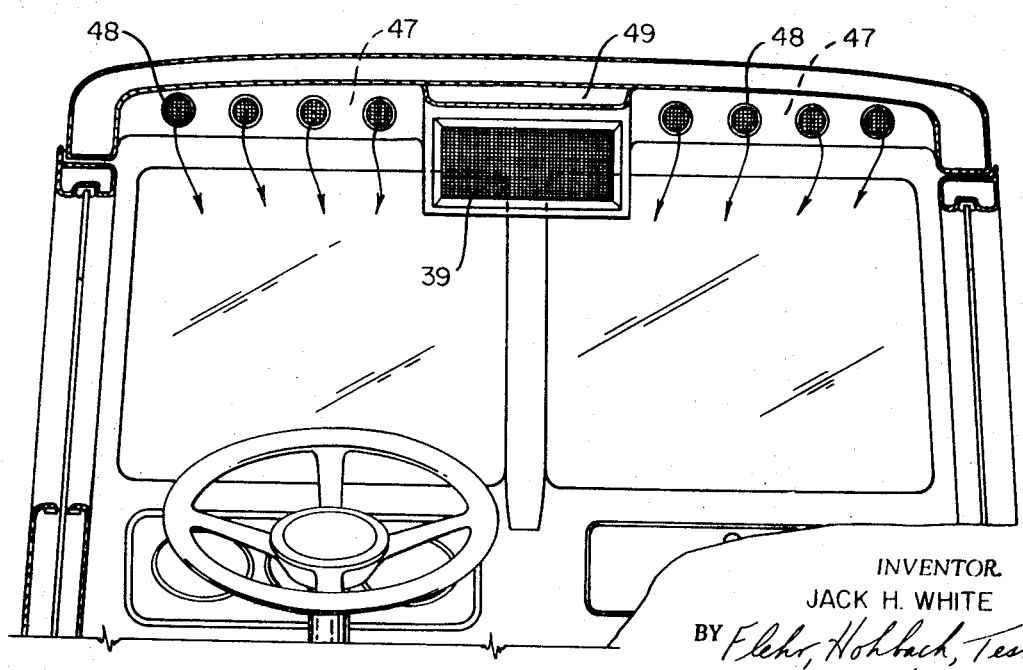
FIG. 6 is an elevation section view taken from the rear showing a portion of a cab of a truck or other vehicle according to the invention.

Thus, as more particularly shown schematically in FIG. 4, louvers 18 and 19 are individually pivotally supported between a pair of fixed spaced supports 50. Each louver 18 is further pivotally coupled to the linkage bar 23 which, in turn, is driven by the connecting rod 22 of pressure-operated cylinder 21. Cylinder 21 is under control of and responsive to temperature changes in radiator 14 by means of thermostat 54, suitable operating connections 56 and controls 57, such as a conventional thermally operated valve, which serve to supply and exhaust pressure into and out of cylinder 21 via supply lines 58 and exhaust lines 59.

Louvers 19 are similarly pivotally coupled to a bail member 53 which is driven by the gas-operated cylinder 51. Cylinder 51 is operatively responsive, via suitable connections 61, to changes in pressure within the condenser 31. The linkage bar 23 and bail member 53 are held in abutting relationship by spring 63. Thus, the louvers 19 may be opened independently of the louvers 18.

Operation of the system is as follows:

Upon initial start-up of engine 12, the temperature in radiator 14 will be relatively low whereby the thermostat associated with radiator 14 will pressure operate cylinder 21 in a manner which closes louvers 18 and provide rapid heat-up of the engine. During this time, it may be desirable to cool the cab because the truck has been standing in the sun. The louvers 19 may open independently to cool the condenser and provide cooling for the cab. After a limited period of operation of engine 12, the thermostat in radiator 14 will call for a certain limited degree of cooling whereupon cylinder 21 will be actuated so as to open louvers 18.

When the radiator thermostat calls for a large amount of cooling, the linkage bar 23 abuts the bail member 53 to override the gas-operated cylinder 51 and provides maximum radiator cooling. The extra cooling for the condenser will not significantly affect its operation.

From the foregoing, it will be readily apparent that louvers 19 are responsive to conditions in condenser unit 31 as well as being responsive to conditions in radiator 14 whereby maximum utilization of the airstream passing through the front end of the truck shall be utilized. Further, it is apparent that enough components of the cooling system have been supplied by utilizing similar components already employed in the vehicle to permit installation of the few remaining required units directly inside the cab.

Customarily, air-conditioning systems for cooling the vehicle cabs have been provided as an addition to the usual heating and windshield defrosting facilities carried by such vehicles. According to the embodiment of the present invention shown in FIGS. 7 and 8, a system has been provided wherein both cab heating and cooling as well as defrosting may be selectively achieved.

Figure 7:
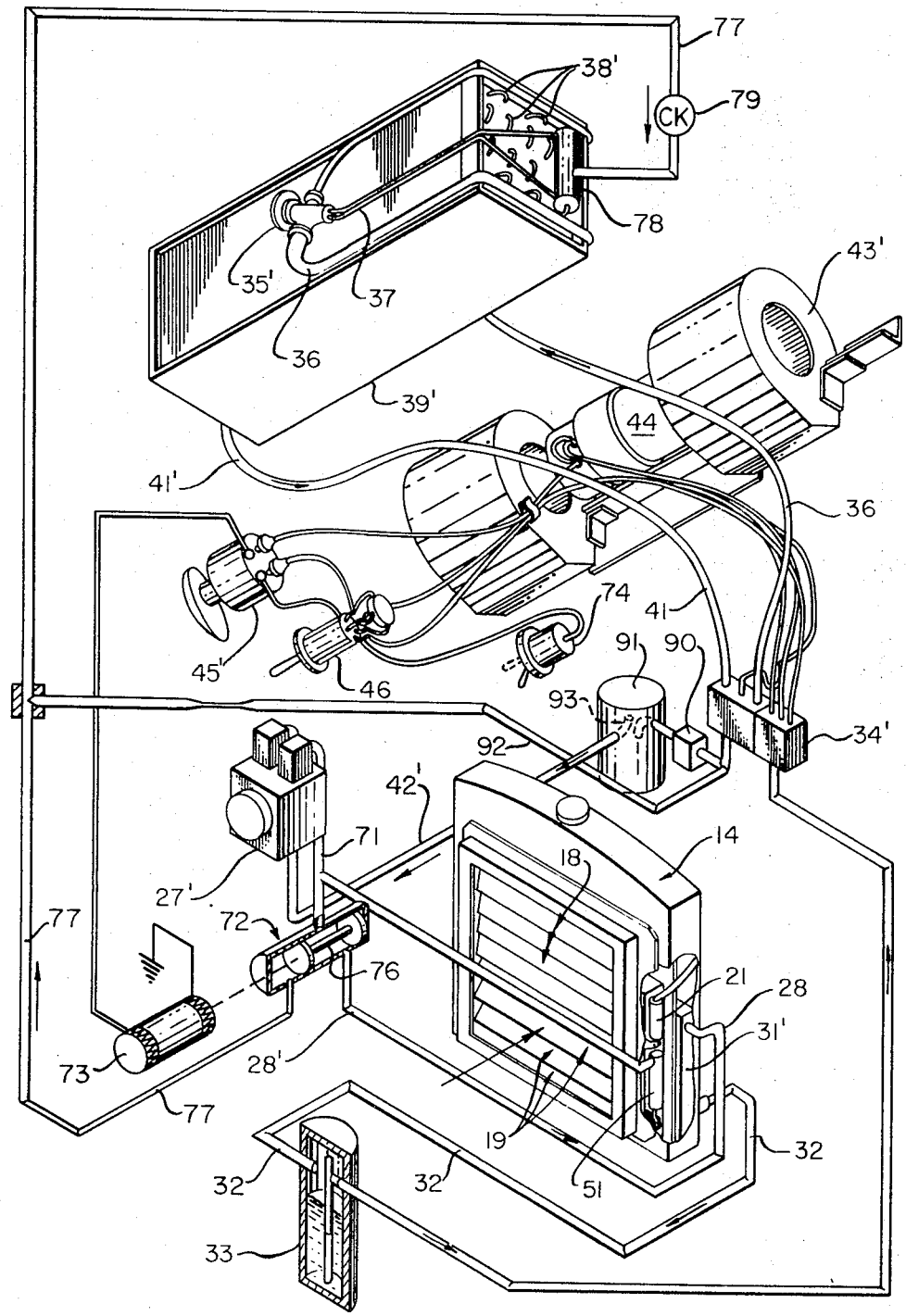
FIG. 7 is a view similar to FIG. 1 showing another embodiment, according to the invention.
Figure 8:
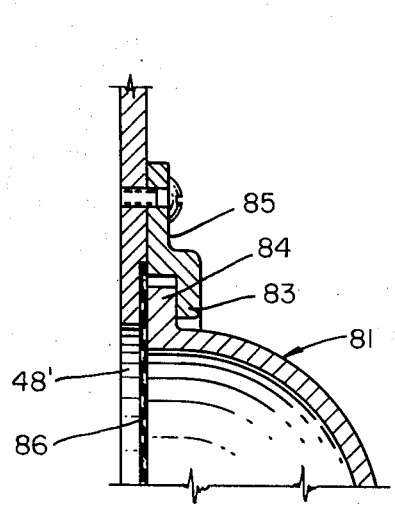
FIG. 8 is a view similar to FIG. 6 showing the embodiment of FIG. 7.
Figure 8:
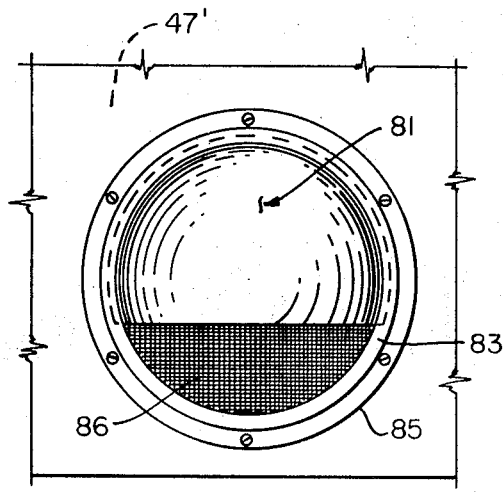
Figure 8:
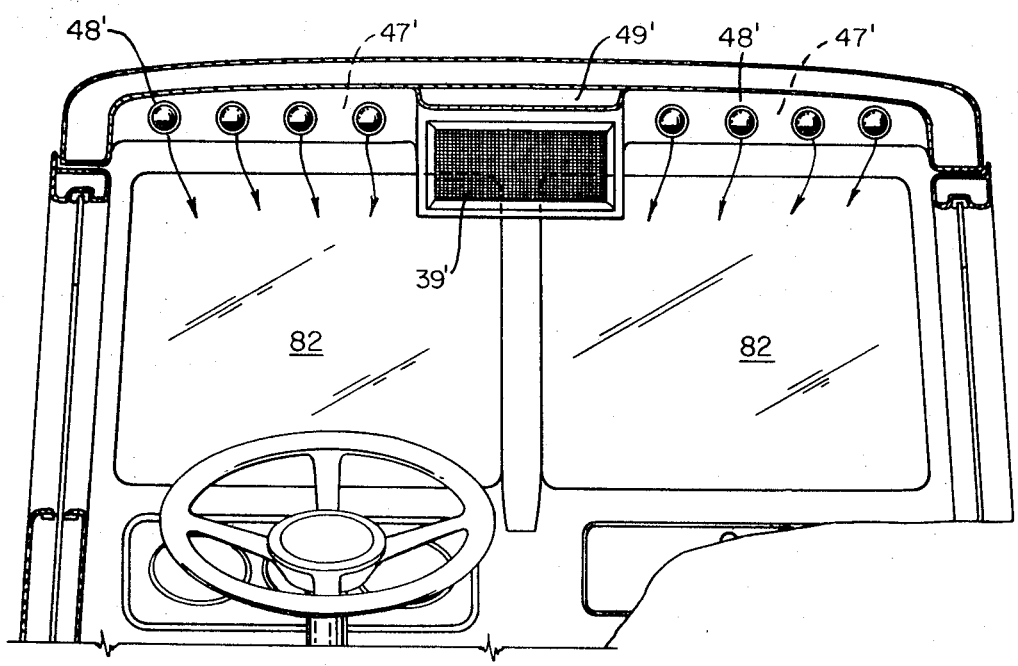

In order to simplify the description of the embodiment shown in FIG. 7 and due to the similarity between a number of components thereof and the embodiment previously described, reference numerals referring to the previous components to the extent employed herein are shown in conjunction with a prime mark (').

Thus, means serving to selectively form a flow path for carrying high temperature, high-pressure refrigerant from compressor 27' into the coils 38' of evaporator unit 39' for warming the airstream passing across such coils by blower unit 43' proceeds as now to be described.

The output or discharge line 71 from compressor unit 27' includes a three-way valve 72 positionable to one or the other of two conditions by means of a solenoid 73 electrically controlled from a heating cycle selector switch 74 and thermostat 45'. In one position (as shown), the spool 76 of valve 72 serves to fluid-couple line 71 to line 28' for a cooling operation as previously described. In its other position, spool 76 serves to fluid-couple line 71 to a line 77 for directly carrying the heated high-pressure gas discharging from compressor 27' to arrive in a heated state or condition at the coils 38' of evaporator unit 39'.

Thus, line 77 feeds to a manifolding "T" connection or chamber 78 via a check valve 79 oriented in the direction shown by the arrow associated therewith for passing gases in a heated state directly into coils 38'. The expansion valve 35' will be understood in the ordinary circumstance to normally include a check valve function whereby the heated gas from line 77 will be blocked from passing elsewhere into the system. Coils 38' function to condense and liquify the refrigerant.

The high pressure, liquid refrigerant leaving coils 38' via line 41' flows to a crankcase pressure regulator valve 90. Valve 90 serves to control the suction pressure at approximately 15 p.s.i.

Liquid refrigerant collects at the bottom of accumulator 91 whereby only when it vaporizes will it be taken into compressor 27'.

A restricted bypass line 92 serves to provide a limited supply of the high-pressure, high-temperature gas of line 77 to the CPR valve 90 to aid in vaporizing refrigerant passing through accumulator 91.

In a cooling cycle the expanding refrigerant passing through valve 35' will travel freely to coils 38' via Tee chamber 78.

To summarize, then, when a heating cycle is called for, switch 74 is conditioned so as to energize solenoid 73 and thereby shift spool 76 from that condition thereof as shown.

Having heated the coils 38', the airstream formed by blower 43' will, of course, be heated and directed into plenum chamber 47' for discharge into the vehicle cab compartment.

Means serving to deflect a portion of the warmed air discharging from plenum chamber 47' includes the deflectors 81 whereby the warm airstream is directly projected against the windshield 82 of the cab of the vehicle. This direct application of the warmed air discharging from plenum chamber 47' serves to defrost windshield 82 whenever the circumstances warrant.

Deflectors 81 comprise spherically shaped portions slidably attached to the periphery of the openings forming discharge ports 48'. Each discharge port 48' is covered by a suitable protective screen 86 as is conventional. A retaining ring 85 formed with an overhanging lip 83 overlays the flange portion 84 of each deflector 81 so as to slidably hold the flange 84 of each deflector 81 whereby the direction of the discharging air from plenum chamber 47' may be adjusted as desired by the driver of the vehicle merely by rotating the deflectors 81 as desired.

For cab cooling, solenoid 73 is shifted to fluid-couple line 28' to the output line 71 of compressor 27'.

The compressor increases the pressure and temperature of the refrigerant and supplies it through valve 72 into condenser 31'.

The engine fan circulates atmospheric air over the outside of the condenser tubes. The tubes are equipped with inner and outer aluminum fins (not shown) to improve the transfer of heat from the refrigerant gas to the air. This removal of heat causes the refrigerant to liquify whereby liquid refrigerant leaves condenser 31' and flows to the receiver dryer 33'.

Receiver-dryer 33' is a liquid storage tank equipped with an outlet tube located on the inside at the bottom to ensure that only liquid is allowed to leave; any entrained vapor and non-condensables collect in the upper part of the receiver 33'.

The liquid also flows through a refrigerant dryer portion (not shown) where an absorbent removes any moisture that may be entrained in the refrigerant. The liquid then flows to thermostatic expansion valve 35 which reduces the liquid pressure and meters the flow to evaporator 39' via line 36.

The drop in liquid pressure in the expansion valve 35' is accompanied by a drop in temperature, thus, the low-pressure, low-temperature liquid that flows into the evaporator tube 38' is colder than the air that is circulated over them by blower 43'. The evaporator tubes 38' are also equipped with aluminum fins (not shown) to increase the heat transfer; therefore, heat is removed from the air being circulated over evaporator tubes 38'. The cooled air is circulated throughout the cab to maintain the desired temperature.

The absorption of heat from the cab air, by the low-temperature liquid refrigerant, causes the liquid to vaporize. This low temperature, low-pressure vapor flows via line 41 through crankcase pressure regulating valve 90 to suction accumulator 91.

Accumulator 91 functions as a liquid separator and protects compressor 27' by allowing only gas to flow to compressor 27' through an outlet port 93 located at the upper part of accumulator 91.

During the cooling cycle, CPR valve 90 acts as a limiting device to prevent overload of the compressor's prime mover (e.g., a diesel engine). The horsepower load on a compressor prime mover increases when the pressure of the suction gas increases. CPR valve 90 senses the inlet pressure to the compressor and throttles the flow if the suction pressure is excessive.

I claim:

1. In a space cooling system for compartments of a vehicle of the type having an engine, a radiator for cooling the engine, a fan associated with the radiator wherein the fan serves to move air for cooling the radiator, and further having air flow control means operatively coupled to respond to variations in the temperature of the radiator for varying the flow of air, cooling apparatus comprising, in a closed loop, a compressor, an evaporator unit disposed in a compartment of the vehicle to be cooled, a condenser unit proximately disposed with respect to said fan to encounter the moving air, and another flow control means serving to pass air to said condenser and radiator, the last named means being operatively coupled to respond to changes in pressure in the condenser for varying the flow of air thereto, the last said flow control means being further responsive to conditioning of the first named flow control means.

2. In a vehicle of a type having an engine, a radiator, a fan associated with the radiator for moving air to cool the radiator, cooling apparatus comprising first air flow control means for controlling the flow of air to the radiator, a closed loop cooling system for cooling a compartment of the vehicle, said system including a condenser unit, said condenser unit being disposed proximate to the fan to encounter air moved by the fan, second air flow control means for controlling the flow of air to the condenser and radiator, and actuator means operatively coupled to said second air flow control means serving, in response to pressure changes in said condenser, to vary the flow of air thereto.

3. In a vehicle of a type having an engine, a radiator, a fan associated with the radiator for moving air to cool the radiator, cooling apparatus comprising first air flow control means for controlling the flow of air to the radiator, first actuator means operatively coupled to said flow control means serving to vary the flow of air to the radiator in response to changes in the temperature in the radiator, a closed loop cooling system for cooling a compartment of the vehicle, said system including a condenser unit, said condenser unit being disposed proximate to the fan to encounter air moved by the fan, second air flow control means for controlling the flow of air to the condenser and radiator, and second actuator means operatively coupled to said second air flow control means serving, in response to pressure changes in said condenser, to vary the flow of air thereto, said second actuator means being yieldably coupled to the first actuator means to permit increase of the flow of air to said condenser independently of the first actuator means.

4. In a vehicle of a type having an engine, a radiator, a fan associated with the radiator for moving air to cool the radiator, cooling apparatus comprising first air flow control means conditionable between closed and open conditions for controlling the flow of a stream of air to the radiator, a closed loop cooling system for cooling a compartment of the vehicle, said system including a condenser unit, said condenser unit being disposed in said stream of air, second air flow control means in said stream and conditionable by said first air flow control means to an open condition to pass air to both said condenser and radiator, said second air flow control means, being otherwise independently operable to open condition responsive to changes of pressure of said condenser for varying the flow of air to said condenser.